(12) United States Patent
Qi (10) Patent No.: US 12,487,460 B2
(45) Date of Patent: Dec. 2, 2025

(54) OPTICAL LENS AND OPTICAL GLASSES

(71) Applicant: VIVO MOBILE COMMUNICATION CO., LTD., Guangdong (CN)

(72) Inventor: Yonghong Qi, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 2 days.

(21) Appl. No.: 18/595,758

(22) Filed: Mar. 5, 2024

(65) Prior Publication Data

US 2024/0201504 A1 Jun. 20, 2024

Related U.S. Application Data

(63) Continuation of application No. PCT/CN2022/117439, filed on Sep. 7, 2022.

(30) Foreign Application Priority Data

Sep. 10, 2021 (CN) .......................... 202111062735.3

(51) Int. Cl.
  *G02B 27/01* (2006.01)
  *F21V 8/00* (2006.01)
  *G02B 26/08* (2006.01)

(52) U.S. Cl.
  CPC ....... *G02B 27/0172* (2013.01); *G02B 6/0031* (2013.01); *G02B 26/085* (2013.01); *G02B 27/0176* (2013.01); *G02B 2027/0178* (2013.01)

(58) Field of Classification Search
  None
  See application file for complete search history.

(56) References Cited

U.S. PATENT DOCUMENTS

| 5,748,172 A | 5/1998 | Song et al. |
| 2015/0378161 A1* | 12/2015 | Bailey ............... G02B 26/10 359/214.1 |
| 2017/0299872 A1 | 10/2017 | Ou et al. |
| 2021/0063754 A1* | 3/2021 | Lee .................. G06F 3/011 |

(Continued)

FOREIGN PATENT DOCUMENTS

| CN | 204989632 U | 1/2016 |
| CN | 106896500 A | 6/2017 |

(Continued)

OTHER PUBLICATIONS

First Office Action for Chinese Application No. 202111062735.3, dated Jul. 13, 2022, 7 Pages.

(Continued)

*Primary Examiner* — Ifedayo B Iluyomade
(74) *Attorney, Agent, or Firm* — BROOKS KUSHMAN P.C.

(57) ABSTRACT

An optical lens and optical glasses. The optical lens includes a lens body, a first reflector group, and a second reflector group. The first reflector group and the second reflector group are both disposed in the lens body. The second reflector group is configured to receive and reflect light rays that are directed toward the first reflector group and reflected at the first reflector group. The first reflector group and the second reflector group both include a plurality of reflectors arranged in rows and columns. Each of the reflectors in the second reflector group is rotatably mounted onto the lens body.

16 Claims, 4 Drawing Sheets

(56) References Cited

U.S. PATENT DOCUMENTS

2021/0141237 A1    5/2021  Schowengerdt
2024/0151979 A1    5/2024  Yang

FOREIGN PATENT DOCUMENTS

| | | |
|---|---|---|
| CN | 206248920 U | 6/2017 |
| CN | 108089332 A | 5/2018 |
| CN | 112782849 A | 5/2021 |
| CN | 112799232 A | 5/2021 |
| CN | 113253458 A | 8/2021 |
| CN | 113820862 A | 12/2021 |
| FR | 3064374 A1 | 9/2018 |
| WO | 2013049248 A2 | 4/2013 |
| WO | 2019113942 A1 | 6/2019 |
| WO | 2020094479 A1 | 5/2020 |
| WO | 2020182472 A1 | 9/2020 |

OTHER PUBLICATIONS

Extended European Search Report for Application No. 22866625.1, dated Nov. 27, 2024, 13 Pages.
International Search Report and Written Opinion for Application No. PCT /CN2022/117439, dated Mar. 27, 2023, 8 Pages.

* cited by examiner

OPTICAL LENS AND OPTICAL GLASSES

CROSS-REFERENCE TO RELATED APPLICATIONS

This application is a continuation of International Application No. PCT/CN2022/117439 filed on Sep. 7, 2022, which claims priority to Chinese Patent Application No. 202111062735.3 filed on Sep. 10, 2021, which are incorporated herein by reference in their entireties.

TECHNICAL FIELD

This application pertains to the technical field of optical devices, and specifically relates to an optical lens and optical glasses.

BACKGROUND

With the development of augmented reality (AR) technology, the performance of AR devices and user experience are also increasingly improved. In current AR devices, a diffraction optical waveguide is usually employed to change an optical path of light rays emitted by a projection system to be within sight of the user's eyes. In the process of changing the optical path in this way, light rays ultimately received by the user undergo first-order diffraction on a single side at least twice. As a result, only a very small part of the light rays emitted by the projection system can be utilized, and most of the light rays are lost during the diffraction process and cannot be received by the user, resulting in a poor contrast of an image formed by the light rays received by the user and an increased power consumption of the projection system.

SUMMARY

According to a first aspect, an embodiment of this application discloses an optical lens. The optical lens includes a lens body, a first reflector group, and a second reflector group. The first reflector group and the second reflector group are both disposed in the lens body. The second reflector group is configured to receive and reflect light rays that are directed toward the first reflector group and reflected at the first reflector group. The first reflector group and the second reflector group both include a plurality of reflectors arranged in rows and columns. Each of the reflectors in the second reflector group is rotatably mounted onto the lens body.

According to a second aspect, an embodiment of this application discloses optical glasses. The optical glasses include a frame, a projection apparatus, and the optical lens described above. The projection apparatus and the optical lens are both fixed to the frame. The projection apparatus can emit light rays toward the first reflector group.

BRIEF DESCRIPTION OF DRAWINGS

The accompanying drawings described herein are intended to provide a further understanding of this application, and form a part of this application. The illustrative embodiments of this application and the description thereof are for explaining this application and do not unduly limit this application. In the accompanying drawings.

REFERENCE SIGNS

100: lens body;
200: first reflector group;
300: second reflector group; 310: reflector body; 320: reflector frame; 330: magnet; and 340: rotating shaft.

DETAILED DESCRIPTION

The following clearly describes the technical solutions in the embodiments of this application with reference to the accompanying drawings in the embodiments of this application. Apparently, the described embodiments are some but not all of the embodiments of this application. All other embodiments derived by persons of ordinary skill in the art based on the embodiments of this application without creative efforts fall within the scope of protection of this application.

The terms "first", "second", and the like in this specification and claims of this application are used to distinguish between similar objects rather than to describe a specific order or sequence. It should be understood that data used in this way is used interchangeably in appropriate circumstances so that the embodiments of this application can be implemented in other orders than the order illustrated or described herein. In addition, "first" and "second" are usually used to distinguish objects of a same type, and do not restrict a quantity of objects. For example, there may be one or a plurality of first objects. In addition, "and/or" in the specification and claims represents at least one of connected objects, and the character "/" generally indicates that the associated objects have an "or" relationship.

With reference to the accompanying drawings, an optical lens and optical glasses provided in the embodiments of this application are described below in detail by using specific embodiments and application scenarios thereof.

As shown in FIG. 1 to FIG. 4, an embodiment of this application discloses an optical lens, which includes a lens body 100, a first reflector group 200, and a second reflector group 300.

Figure 1:
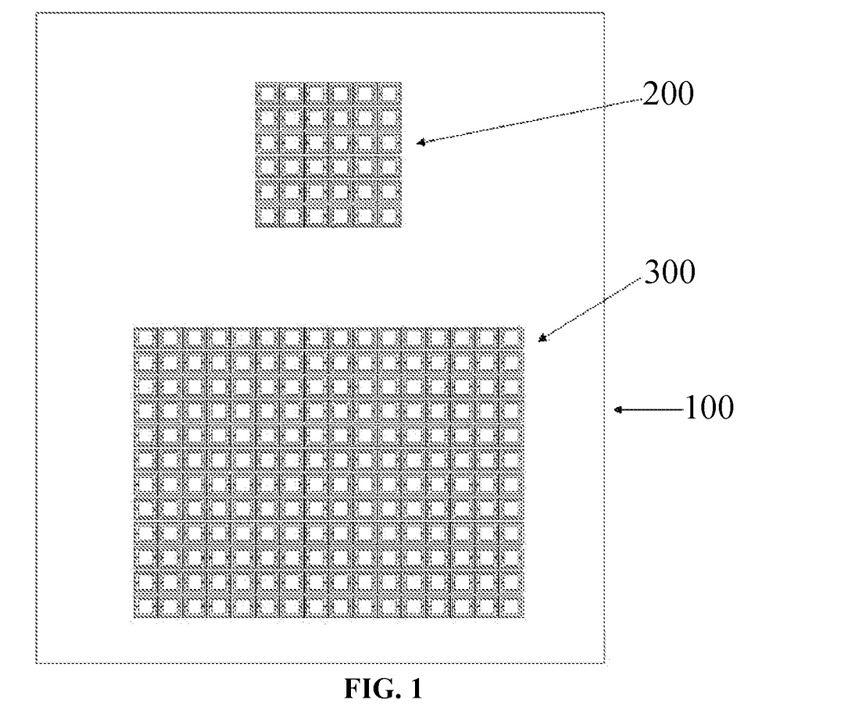
FIG. 1 is a schematic structural diagram of an optical lens according to an embodiment of this application.
Figure 2:
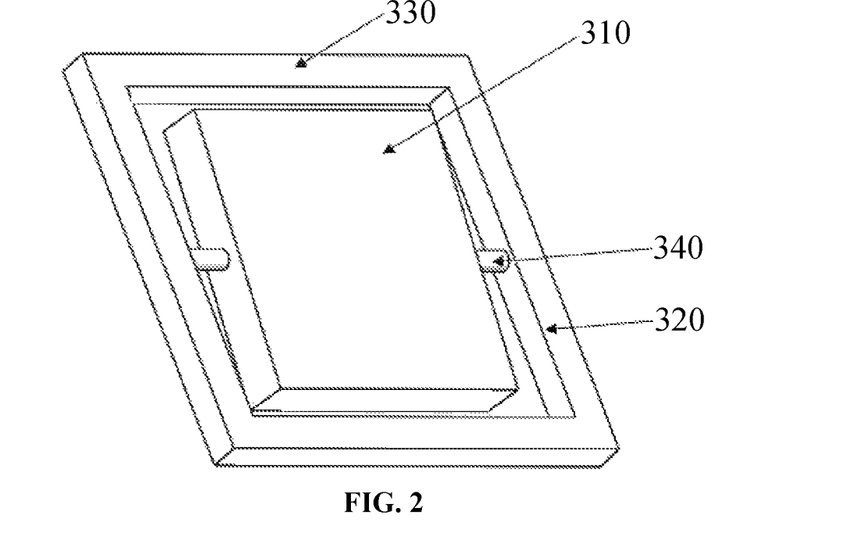
FIG. 2 is a schematic diagram of a partial structure in an optical lens according to an embodiment of this application.

The lens body 100 is a main part of the optical lens, and may be made of a light-transmitting material such as glass, plastic, or resin. A shape, a size, and another parameter of the lens body 100 may all be determined based on actual needs. The lens body 100 may generally be a rectangular structural member, or the lens body 100 may be an elliptical or approximately elliptical structural member.

The first reflector group 200 and the second reflector group 300 are both disposed in the lens body 100. Optionally, the first reflector group 200 and the second reflector group 300 may be distributed along a length direction of the lens, or along a width direction of the lens. Certainly, the first reflector group 200 and the second reflector group 300 may also be distributed along a direction such as a diagonal line of the lens, which is not limited herein.

Moreover, the first reflector group 200 and the second reflector group 300 both include a plurality of reflectors arranged in rows and columns. In this case, a size of each reflector can be made relatively small, thereby minimizing the installation difficulty of the first reflector group 200 and the second reflector group 300. Specifically, a quantity of reflectors included in each of the first reflector group 200 and the second reflector group 300 and a spacing between any two adjacent reflectors may be determined depending on actual conditions. The optical lens is usually used together with a projection apparatus, and a light beam emitted by the projection apparatus is usually a diffuse light beam. Based on this, a coverage area of the first reflector group 200 may be made less than that of the second reflector group 300, thereby minimizing overall dimensions of the first reflector group 200 and reducing the machining difficulty of the entire optical lens, while ensuring that the second reflector group 300 can receive light rays reflected from the first reflector group 200.

As mentioned above, the optical lens can be used together with the projection apparatus, and the first reflector group 200 and the second reflector group 300 can both reflect light rays. In use, when the optical lens is required to reflect light rays, light rays emitted by the projection apparatus may be radiated onto the first reflector group 200. By setting parameters such as a position and an orientation of each reflector in the first reflector group 200 and the second reflector group 300, it can be ensured that light rays reflected by the first reflector group 200 can be radiated onto the second reflector group 300 and be reflected to the user's eyes through the second reflector group 300. In other words, the second reflector group 300 can receive and reflect the light rays that are directed toward the first reflector group 200 and reflected at the first reflector group 200.

In addition, each reflector in the second reflector group 300 is rotatably mounted onto the lens body 100, such that an overall orientation of the second reflector group 300 can be changed. Correspondingly, in a case that the second reflector group 300 is provided with a driving device, the entire second reflector group 300 can be driven to rotate relative to the lens body 100 by means of the driving device. In a case that the second reflector group 300 can rotate, a propagation direction of light rays reflected from the second reflector group 300 may be adjusted, such that the reflected light rays enter the user's eyes at a better angle, thereby improving the user's viewing experience.

Specifically, each reflector in the second reflector group 300 can be individually equipped with a driving device. The driving device may be a rotational motor or the like. Connecting an output shaft of a driving motor to a reflector enables the corresponding reflector to be rotated in a case that the driving motor works. In a case that a plurality of reflectors in the second reflector group 300 are rotated together, the orientation of the entire second reflector group 300 can be changed, thereby changing the propagation direction of the reflected light rays from the second reflector group 300.

An embodiment of this application discloses an optical lens and optical glasses, where the optical lens includes a lens body 100, and a first reflector group 200 and a second reflector group 300 that are disposed in the lens body 100. The first reflector group 200 and the second reflector group 300 both include a plurality of reflectors arranged in rows and columns, such that the reflectors match shapes of different regions on the lens body 100 better, reducing the layout difficulty of the first reflector group 200 and the second reflector group 300. Moreover, the second reflector group 300 can receive and reflect light rays that are directed toward the first reflector group 200 and reflected at the first reflector group 200, so that the light rays are finally reflected into the user's eyes to form a corresponding image. In the foregoing process, because changes in a propagation direction of the light rays are all affected by reflection, maximizing propagation of the light rays directed toward the first reflector group 200 to the user's eyes can reduce an optical loss and improve a contrast of an image formed by the light rays received by the user, and can improve the energy utilization efficiency of a projection system used together with the optical lens and reduce its power consumption.

Moreover, each reflector in the second reflector group 300 is rotatably mounted onto the lens body 100, and an orientation of the entire second reflector group 300 can be changed by changing an orientation of each reflector in the second reflector group 300. In this way, the propagation direction of the light rays emitted from the second reflector group 300 to the user's eyes can be changed, thereby making the optical lens more adaptable and improving the user's viewing experience.

As mentioned above, the reflectors in the second reflector group 300 are all rotatably mounted onto the lens body 100, and because a component, used to propagate light rays to the user's eyes, of the optical lens is the second reflector group 300, in order to allow for a better straightness of the light rays propagated to the user's eyes and an improved fidelity effect of the image, the second reflector group 300 can be basically located in a center region of the lens body 100 in the optical lens.

Figure 3:
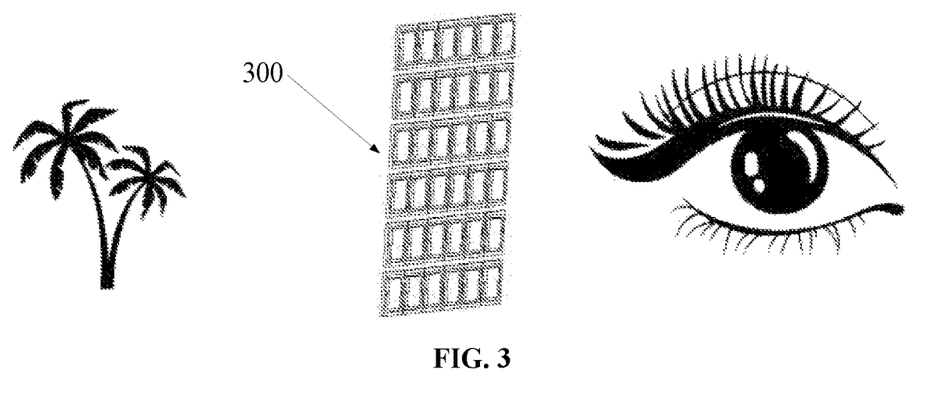
FIG. 3 is a first schematic diagram illustrating a working principle of an optical lens in a reflective state according to an embodiment of this application.
Figure 4:
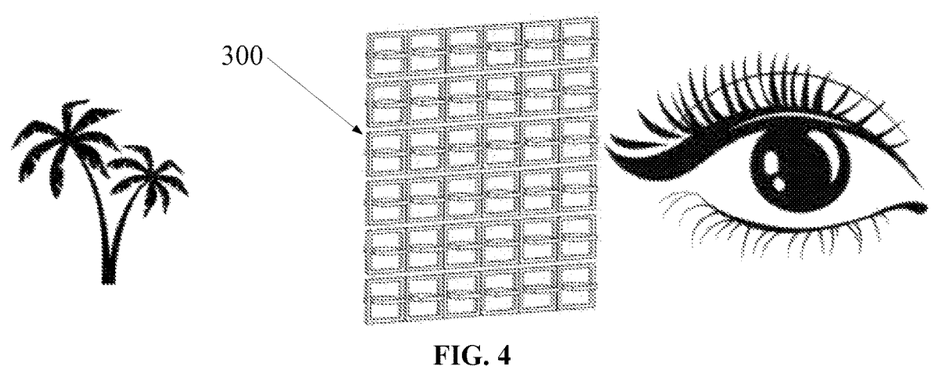
FIG. 4 is a first schematic diagram illustrating a working principle of an optical lens in a transmissive state according to an embodiment of this application.
Figure 5:
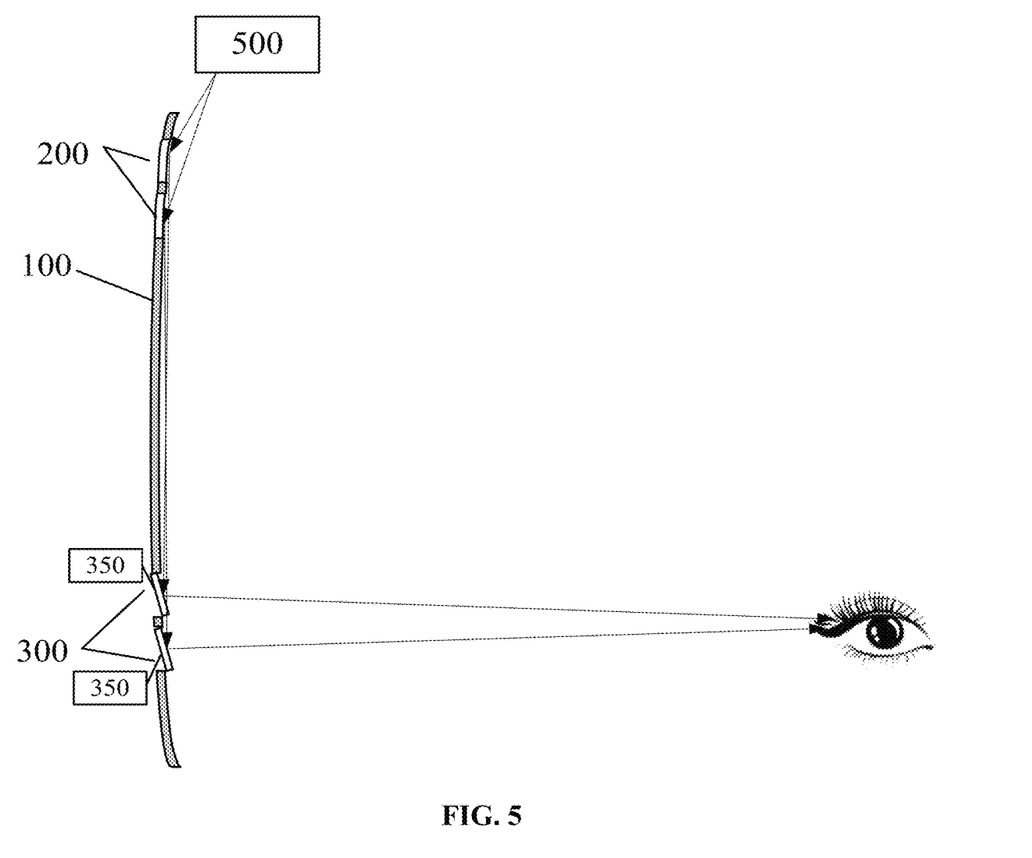
FIG. 5 is a second schematic diagram illustrating a working principle of an optical lens in a reflective state according to an embodiment of this application.
Figure 6:
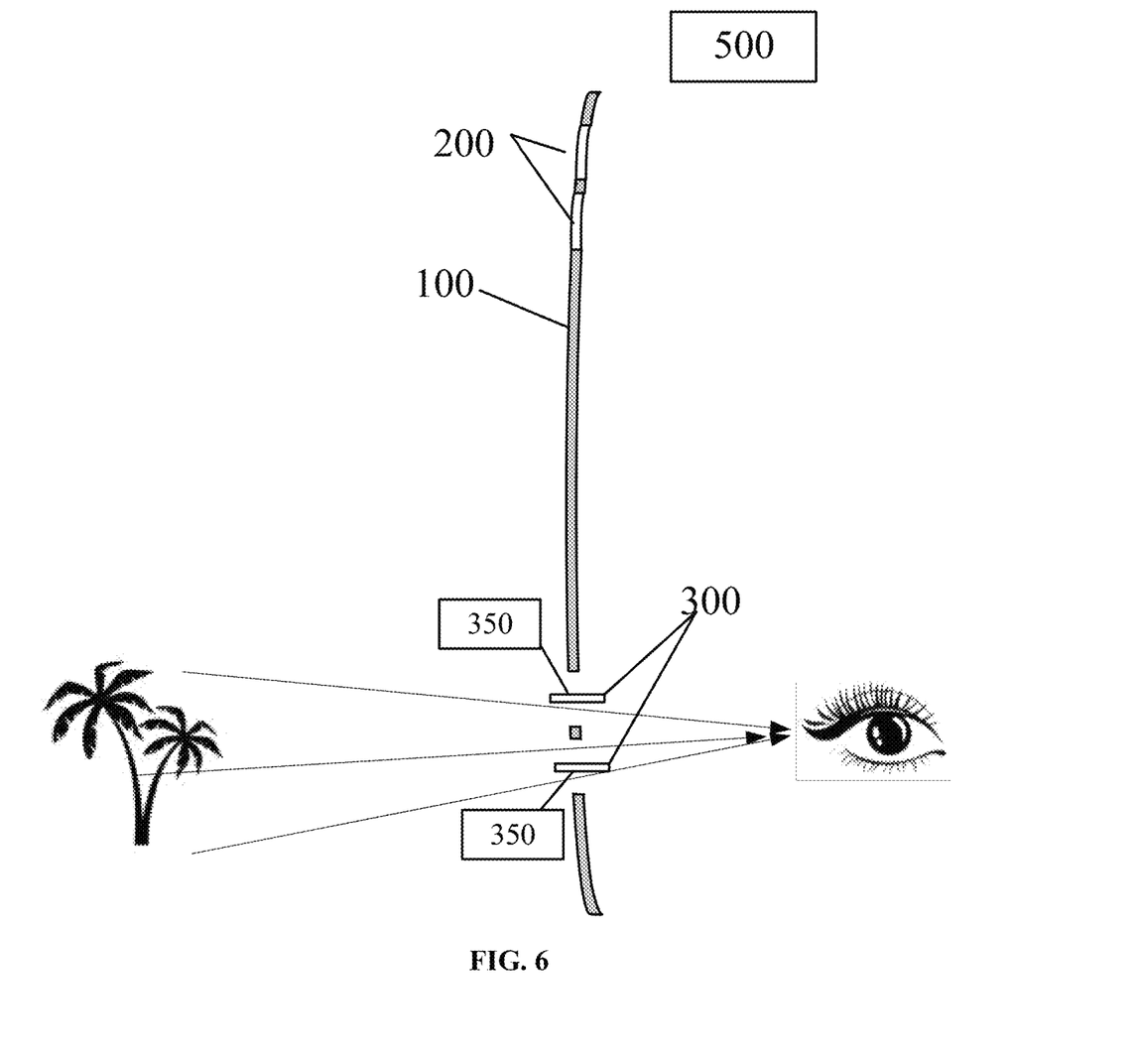
FIG. 6 is a second schematic diagram illustrating a working principle of an optical lens in a transmissive state according to an embodiment of this application.

Based on the foregoing situation, in a case that the second reflector group 300 in the optical lens can reflect the light rays to the user's eyes, light rays on two opposite sides of the lens body 100 can hardly pass through regions covered by the reflectors in the second reflector group 300, which causes the second reflector group 300 to block the user from viewing an image on a side of the lens body 100 away from the user's eyes. Based on this, further, each reflector in the second reflector group 300 includes a reflector body 310 and a driving member 350. The reflector body 310 is rotatably mounted onto the lens body 100. As shown in FIG. 3 and FIG. 4, the driving member 350 is connected to the reflector body 310 to drive the reflector body 310 to rotate and to make the reflector body 310 to switch between a reflective state and a transmissive state.

In a case that the reflector body 310 is in the reflective state, a projection of the reflector body 310 in a thickness direction of the lens body 100 is a first projection, and the reflector body 310 can receive and reflect the light rays that are directed toward the first reflector group 200 and reflected at the first reflector group 200. In other words, when the reflector body 310 is in the reflective state, the reflector body 310 can reflect the light rays emitted from the first reflector and finally direct the light rays into the user's eyes. Specifically, the thickness direction of the lens body 100 may be determined based on an actual structure of the lens body 100. In a case that the entire lens body 100 is of a curved structure, the first projection of the reflector body 310 in the reflective state may specifically be in an actual thickness direction at a position of the reflector body 310 in the lens body 100.

Accordingly, in a case that reflector bodies 310 of the plurality of reflectors are all in the reflective state, the entire second reflector group 300 can cooperate with the first reflector group 200, so that the light rays reflected from the first reflector group 200 are all propagated to the second reflector group 300, and under the joint action of the plurality of reflector bodies 310 in the second reflector group 300, the light rays are propagated into the user's eyes to form a corresponding image. It should be noted that, in a case that the lens body 100 is of a non-flat structure such as a curved structure, orientations of the plurality of reflector bodies 310 in the reflective state in the second reflector group 300 may be the same or different. This is related to parameters such as actual positions of the plurality of reflector bodies 310 in the second reflector group 300.

In a case that the reflector body 310 is in the transmissive state, the projection of the reflector body 310 in the thickness direction of the lens body 100 is a second projection. Similarly, in a case that the lens body 100 is a non-flat structural member, or in other words, in a case that the thickness direction of the lens body 100 is not unique, the second projection is specifically a projection of the reflector body 310 along the thickness direction at the position of the reflector body 310 in the lens body 100. Moreover, an area of the second projection is less than that of the first projection. In other words, compared with the case that the reflector body 310 is in the reflective state, in the case that the reflector body 310 is in the transmissive state, the reflector body 310 blocks the propagation of light rays on the two opposite sides of the lens body 100 in a relatively smaller area, which allows light rays on one side of the lens body 100 to be propagated to the other side of the lens body 100 through an area avoided by the reflector body 310 during rotation. Optionally, in a case that the reflector body 310 is maintained in the transmissive state, the thickness direction of the reflector body 310 may be perpendicular to the thickness direction of the lens body 100. The thickness direction of the lens body 100 is specifically a thickness direction of a region in which the reflector body 310 is located in the lens body 100.

Similarly, in a case that the reflector bodies 310 of the plurality of reflectors are all in the transmissive state, a larger amount of light rays can be transmitted through the entire second reflector group 300, so that basically all light rays on one side of the lens body 100 can be propagated to the other side of the lens body 100 through the lens body 100, thereby ensuring that when the user wears the optical lens of the foregoing structure, light rays from the outside of the optical lens can also pass through the optical lens to reach the user's eyes. Similarly, in a case that the lens body 100 is of a non-flat structure such as a curved structure, orientations of the plurality of reflector bodies 310 in the transmissive state in the second reflector group 300 may be the same or different.

As mentioned above, the driving member 350 may be a rotational motor. Under the driving action of the rotational motor, the plurality of reflector bodies 310 in the second reflector group 300 can be driven to rotate to switch between the reflective state and the transmissive state. In another embodiment of this application, optionally, the driving member 350 includes a wire, which is fixed to the reflector body 310. The lens body 100 is provided with two magnets 330, and the two magnets 330 are disposed opposite each other. Certainly, magnetic poles of the two magnets 330 disposed opposite each other with one of which faces the other are an N pole and an S pole respectively to ensure that a magnetic field relatively stable in both direction and size is formed between the two magnets 330, providing basic conditions for the movement of the wire. In this way, the wire, in a case of being energized, can move within the magnetic field formed by the two magnets 330. Because the wire is fixed to the reflector body 310, during the movement of the wire, the reflector body 310 can also be driven to rotate, and in a case that an opposing current is supplied to the wire, the reflector body 310 can be switched between the reflective state and the transmissive state.

As compared with the rotational motor, in the foregoing scheme of driving the reflector body 310 to rotate, a size of the components used is relatively small, which can minimize an area of a blocked region in the lens body 100. Moreover, in a case that the foregoing driving scheme is used for all the plurality of reflector bodies 310 in the second reflector group 300, by means of connecting wires respectively fixed to the plurality of reflector bodies 310 to each other, one cable can be used to drive the plurality of reflector bodies 310 at the same time to rotate together, which can also reduce the control difficulty when the plurality of reflector bodies 310 in the second reflector group 300 switch between the reflective state and the transmissive state.

Specifically, the reflector body 310 may be rotatably mounted onto the lens body 100 using a rotating shaft 340 to improve the stability of the reflector body 310 during rotation. In a case of providing the rotating shaft 340, the rotating shaft 340 may be used to assist the wire fixed to the reflector body 310 for electrical connection. Specifically, the wire may be extended to the rotating shaft 340, and the wire and the rotating shaft 340 are brought into contact with each other, so as to ensure that the wire can always be in the energized state through contact with the rotating shaft 340, without preventing the reflector body 310 from rotating about the rotating shaft 340.

Moreover, in order to ensure that the energized wire has the ability to drive the reflector body 310 to rotate, during the layout of the wire, it is necessary to make at least part of the wire perpendicular to a direction of the magnetic field between the two magnets 330, or in other words, to make an extension direction of the wire have a component perpendicular to the direction of the magnetic field. In other words, during the layout of the wire, extension directions of all parts of the wire cannot be parallel to the direction of the magnetic field to ensure that the energized wire has the ability to move in the magnetic field. In addition, the extension direction of the wire is also related to a rotation axis of the reflector body 310. Specifically, it is necessary that a force received by the energized wire in the magnetic field has at least a component perpendicular to the rotation axis of the reflector body 310, to ensure that when the wire moves in the magnetic field, a driving force can be provided for the reflector body 310 such that the reflector body 310 can rotate relative to the lens body 100 to switch between the reflective state and the transmissive state.

In a specific embodiment, the reflector body 310 is rotatably mounted onto the lens body 100 via the rotating shaft 340, and the wire includes a part parallel to the rotating shaft 340. This part of the wire is fixedly connected to the reflector body 310. When the wire is energized, the part of the wire parallel to the rotating shaft 340 can drive the reflector body 310 to rotate due to the magnetic field. In addition, it should be noted that when the reflector body 310 is driven to rotate, a rotation angle of the reflector body 310 may be limited by providing a limiting structure or the like, to prevent the reflector body 310 from rotating to a state parallel to the direction of the magnetic field, thereby ensuring that the force received by the energized wire in the magnetic field always has the ability to drive the reflector body 310 to rotate.

Optionally, each reflector in the second reflector group 300 further includes a reflector frame 320. The reflector frame 320 is fixed to the lens body 100, and the reflector body 310 is rotatably mounted onto the reflector frame 320 via the rotating shaft 340, which can improve the rotational stability of the reflector body 310 and obviate the need to separately open a hole for mounting the rotating shaft 340 on the lens body 100. This can not only reduce the machining difficulty, but can also prevent the presence of the foregoing hole from producing adverse effects on the structural stability and light transmission performance of the lens body 100. Specifically, the reflector frame 320 may be made of a hard material such as metal or plastic. Optionally, the reflector frame 320 is made of a transparent material, so that after a plurality of reflector frames 320 are mounted in the lens body 100, the reflector frames 320 basically do not block light rays, further improving the light transmission capability of the entire optical lens. A size and a shape of the reflector frame 320 may be determined depending on actual conditions, and the size and the shape of the reflector frame 320 correspond to the shape of the reflector body 310. For example, the reflector frame 320 and the reflector body 310 may both be circular structural members. Certainly, both of them may alternatively be rectangular structural members or the like.

With the use of the foregoing technical solution, a plurality of reflector bodies 310 and a plurality of wires can form a plurality of independent reflective assemblies via a plurality of rotating shafts 340 and a plurality of reflector frames 320. Each reflective assembly includes a reflector frame 320, a rotating shaft 340, a reflector body 310, and a wire. During the process of assembling the second reflector group 300, a plurality of reflector bodies 310 can be mounted in groups, thereby reducing the difficulty of assembling the reflectors.

Moreover, in the foregoing embodiment, a position, an orientation, and another parameter of the two magnets 330 used to provide the magnetic field may further be determined based on parameters such as the extension direction of the rotating shaft 340 and the layout position of the wire, so that the direction of the magnetic field between the two magnets 330 is perpendicular to the axial direction of the rotating shaft 340. In this case, all forces received by the energized wire in the magnetic field can basically act on the reflector body 310 to drive the reflector body 310 to rotate, thereby improving the utilization efficiency of the driving effect. Specifically, the two magnets 330 face each other with opposite magnetic poles; by making surfaces of the two magnets 330 facing each other parallel to the axial direction of the rotating shaft 340, and making a perpendicular line between the surfaces of the two magnets 330 facing each other perpendicular to the axial direction of the rotating shaft 340, it can be ensured that the direction of the magnetic field between the two magnets 330 is perpendicular to the axial direction of the rotating shaft 340.

Optionally, the plurality of reflector bodies 310 in the second reflector group 300 may be equipped with only two magnets 330 disposed opposite each other, and the two magnets 330 provide magnetic forces for the plurality of wires fixed to the reflector bodies 310. In another embodiment of this application, each reflector frame 320 is provided with two magnets 330 disposed opposite each other, and a direction of a magnetic field between the two magnets 330 mounted onto the same reflector frame 320 is perpendicular to the axial direction of the rotating shaft 340 mounted onto the reflector frame 320. In this embodiment, the reflector frame 320 and the reflector body 310 may both be rectangular structural members, which makes the connection stability between the magnet 330 and the reflector frame 320 relatively better, and can minimize the adverse effects of the components such as the reflector frame 320 and the magnets 330 on the light transmission performance of optical lens. In addition, wires may be provided on both sides of the reflector body 310 parallel to the rotating shaft 340, and opposing currents are supplied to the two sets of wires, thereby further increasing the driving force of the wires acting on the reflector body 310 and increasing a response rate of the reflector body 310 between the reflective state and the transmissive state.

With the use of the foregoing technical solution, the size of each magnet 330 can be reduced, thereby reducing the blocking effect of the magnet 330 on light rays to the maximum extent and improving the light transmission capability of the lens body 100. In addition, in a case that each reflector frame 320 is separately equipped with two magnets 330, the position, the orientation, and another parameter of each pair of magnets 330 can be determined accordingly based on the actual parameters such as the orientation of the reflector body 310 that cooperates with the pair of magnets 330. It can be ensured that magnetic field forces acting on the wires fixed to different reflector bodies 310 are all basically equal, so that when equal currents are supplied to the wires, forces acting on the wires are basically equal, and a switching time of each reflector body 310 between the reflective state and the transmissive state is basically equal, which improves the consistency of the entire second reflector group 300 and thereby improves the user experience for the optical lens.

In the foregoing embodiment, the purpose of driving the reflector body 310 to rotate relative to the lens body 100 is achieved by using the interaction between a magnetic field and an energized wire. In another embodiment of this application, optionally, the driving member 350 includes an electroactive member, which can provide a driving effect by changing its shape and other parameters in different energized states. Based on this, in a case that the electroactive member is in one of an energized state and a de-energized state, the reflector body 310 is maintained in the reflective state; and in a case that the electroactive member is in the other one of the energized state and the de-energized state, the reflector body 310 is maintained in the transmissive state. In other words, by switching the electroactive member between the energized state and the de-energized state, the reflector body 310 can also be switched between the reflective state and the transmissive state. Specifically, the electroactive member may be mounted in the lens body 100, and a deformable part of the electroactive member is connected to the reflector body 310, so as to drive the reflector body 310 to rotate through the electroactive member, achieving the purpose of switching between the reflective state and the transmissive state.

In the foregoing embodiment, a range of the rotation of the reflector body 310 driven by the electroactive member may be determined according to actual conditions. Optionally, in a case that the reflector body 310 is maintained in the transmissive state, the thickness direction of the reflector body 310 may be perpendicular to the thickness direction of the lens body 100. In this case, an area of the projection of the reflector body 310 in the thickness direction of the lens body 100 can be minimized, thereby improving the light transmission capability of the lens body 100 to the maximum extent. Similarly, the thickness direction of the lens body 100 is specifically a thickness direction of a region in which the reflector body 310 is located in the lens body 100.

In a case that the entire lens body 100 is of an arc-shaped structure, thickness directions of different regions of the lens body 100 that correspond to the plurality of reflector bodies 310 are also different, and by making all thickness directions of the reflector bodies 310 in the transmissive state perpendicular to the thickness directions of the regions in which the corresponding reflector bodies 310 are located in the lens body 100, it is ensured that areas blocked by the plurality of reflector bodies 310 are all basically minimized, thereby maximizing a light transmission area of the lens body 100 and increasing an amount of external light rays that pass through the optical lens to reach the user's eyes.

As mentioned above, in the optical lens provided in this embodiment of this application, each reflector body 310 in the second reflector group 300 has the reflective state and the transmissive state, which allows the user to use the optical lens to obtain light rays reflected by the first reflector group 200 and the second reflector group 300, and to use the optical lens to obtain light rays from the outside of the optical lens passing through the optical lens.

In order to further expand the function of the optical lens, optionally, each reflector body 310 in the second reflector group 300 further has a superposition state. In a case that the reflector body 310 is in the superposition state, the driving member 350 drives the reflector body 310 to rotate, thereby causing the reflector body 310 to switch back and forth between the reflective state and the transmissive state. By utilizing the principle of persistence of vision, an image formed by the light rays reflected by the first reflector group 200 and the second reflector group 300 and an image formed by external light rays passing through the optical lens are superimposed on each other, allowing the user to receive a composite image formed by the superposition of the virtual image and the real image, so that the optical lens also has an ability to augment reality, further expanding the function of the optical lens.

Specifically, the driving member 350 may drive the reflector body 310 to always rotate in the same direction. Alternatively, when the foregoing technical solution including wires is used for the driving member 350, opposing currents may be frequently supplied to the wires to cause the reflector body 310 to rotate back and forth. Both can ensure that the reflector body 310 can switch back and forth between the reflective state and the transmissive state. In a case that the reflector body 310 rotates back and forth, times in which the second reflector group 300 is in the reflective state and the transmissive state are basically the same, and a switching duration of the reflector body 310 between the reflective state and the transmissive state can be shortened. In other words, a cycle of the reflector body 310 switching back and forth is relatively short, thereby maximizing the effect of image superposition and improving the user experience. In addition, a rotation speed of the reflector body 310 switching back and forth between the reflective state and the transmissive state may be determined depending on actual conditions, which is not limited herein.

Based on the foregoing embodiment, optionally, each reflector body 310 in the first reflector group 200 may also be rotatably mounted onto the lens body 100, and each reflector body 310 in the first reflector group 200 also has a reflective state, a transmissive state, and a superposition state, thereby improving the light transmission performance of the optical lens to the maximum extent, so that light rays from the outside of the optical lens can better pass through the optical lens to reach the user's eyes.

As mentioned above, a light beam emitted by the projection apparatus is usually a diffuse light beam. In this case, an overall size of the second reflector group 300 may be made less than that of the first reflector group 200. Specifically, an area of a figure surrounded by edges of the first reflector group 200 is less than that of a figure surrounded by edges of the second reflector group 300, thereby minimizing an area of a region occupied by the first reflector group 200 and increasing an area of a light-transmitting region on the lens body 100.

Based on the foregoing embodiment, in order to maximize a reflection capability of the second reflector group 300, a shape of the figure formed by the edges of the first reflector group 200 and a shape of the figure formed by the edges of the second reflector group 300 may be made the same. Moreover, a line connecting a center of the first reflector group 200 and a center of the second reflector group 300 may be made consistent with a propagation direction of a light ray from the center of the first reflector group 200 to the center of the second reflector group 300. In this case, it can basically be ensured that the positions of the first reflector group 200 and the second reflector group 300 correspond to each other, and all the light rays reflected from the first reflector group 200 can be basically propagated to the second reflector group 300, and a corresponding diffusion effect is produced during the propagation of the light rays, thereby expanding the coverage area of the light rays.

Based on the optical lens disclosed in any one of the foregoing embodiments, an embodiment of this application further provides optical glasses, which include a frame, a projection apparatus, and any one of the optical lenses described above. Certainly, there may be two optical lenses to better adapt to the user's eyes. The projection apparatus and the optical lens are both fixed onto the frame. The projection apparatus can emit light rays, and the emitted light rays can be directed toward the first reflector group 200. The light rays are reflected at the first reflector group 200 and directed toward the second reflector group 300. The second reflector group 300 can also provide reflection for the light rays, so that the light rays finally reach the user's eyes to form an image represented by the light rays emitted by the projection apparatus. During the propagation process of the light rays from the projection apparatus in the foregoing optical glasses, all changes in a propagation direction are affected by reflection. In this way, a loss of light rays is relatively small, which can ensure that parameters such as clarity and contrast of the image formed by the light rays propagated to the user's eyes are relatively high, providing a relatively good user experience.

The electronic device disclosed in the embodiments of this application may be a smartphone, a tablet computer, an e-book reader, a wearable device, or the like. The embodiments of this application do not limit a specific type of the electronic device.

It should be noted that in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and apparatus in the embodiments of this application is not limited to performing functions in the order shown or discussed, but may also include performing the functions substantially at the same time or in reverse order depending on the functions involved. For example, the described methods may be performed in an order different from that described, and various steps may also be added, omitted, or combined. In addition, features described with reference to some examples may be combined in other examples.

The embodiments of this application are described above with reference to the accompanying drawings, but this application is not limited to the foregoing specific implementations. The foregoing specific implementations are merely illustrative instead of restrictive. Under the enlightenment of this application, persons of ordinary skills in the art may make many forms without departing from the essence of this application and the scope of protection of claims, all of which fall within the protection of this application.

The invention claimed is:

1. An optical lens, comprising a lens body, a first reflector group, and a second reflector group, wherein the first reflector group and the second reflector group are both disposed in the lens body, the second reflector group is configured to receive and reflect light rays that are directed toward the first reflector group and reflected at the first reflector group, the first reflector group and the second reflector group both comprise a plurality of reflectors arranged in rows and columns, and each of the reflectors in the second reflector group is rotatably mounted onto the lens body,
wherein each of the reflectors in the second reflector group comprises a reflector body and a driving member, the reflector body is rotatably mounted onto the lens body, and the driving member is connected to the reflector body to drive the reflector body to rotate and switch between a reflective state and a transmissive state, wherein
in a case that the reflector body is in the reflective state, a projection of the reflector body in a thickness direction of the lens body is a first projection, and the reflector body is configured to receive and reflect the light rays that are directed toward the first reflector group and reflected at the first reflector group; and
in a case that the reflector body is in the transmissive state, the projection of the reflector body in the thickness direction of the lens body is a second projection, and an area of the second projection is less than that of the first projection.

2. The optical lens according to claim 1, wherein the driving member comprises a wire, the wire is fixed to the reflector body, the lens body is provided with two magnets disposed opposite each other, and the wire, in a case of being energized, moves within a magnetic field generated by the two magnets to drive the reflector body to rotate and switch between the reflective state and the transmissive state.

3. The optical lens according to claim 2, wherein each of the reflectors in the second reflector group further comprises a reflector frame, the reflector frame is fixed to the lens body, the reflector body is rotatably mounted onto the reflector frame via a rotating shaft, and a direction of the magnetic field between the two magnets is perpendicular to an axial direction of the rotating shaft.

4. The optical lens according to claim 3, wherein each of the reflector frames is provided with two magnets disposed opposite each other, and a direction of a magnetic field between the two magnets mounted onto the same reflector frame is perpendicular to the axial direction of the rotating shaft mounted onto the reflector frame.

5. The optical lens according to claim 1, wherein the driving member comprises an electroactive member; in a case that the electroactive member is in one of an energized state and a de-energized state, the reflector body is maintained in the reflective state; and in a case that the electroactive member is in the other one of the energized state and the de-energized state, the reflector body is maintained in the transmissive state.

6. The optical lens according to claim 5, wherein in a case that the reflector body is maintained in the transmissive state, a thickness direction of the reflector body is perpendicular to that of the lens body.

7. The optical lens according to claim 1, wherein each reflector body in the second reflector group further has a superposition state, and in a case that the reflector body is in the superposition state, the driving member drives the reflector body to rotate and switch back and forth between the reflective state and the transmissive state.

8. The optical lens according to claim 1, wherein a line connecting a center of the first reflector group and a center of the second reflector group is consistent with a propagation direction of a light ray from the center of the first reflector group to the center of the second reflector group, and an area of a figure surrounded by edges of the first reflector group is less than that of a figure surrounded by edges of the second reflector group.

9. Optical glasses, comprising a frame, a projection apparatus, and an optical lens, wherein the projection apparatus and the optical lens are both fixed to the frame, and the projection apparatus is capable of emitting light rays toward the first reflector group;
wherein the optical lens comprises: a lens body, a first reflector group, and a second reflector group, wherein the first reflector group and the second reflector group are both disposed in the lens body, the second reflector group is configured to receive and reflect light rays that are directed toward the first reflector group and reflected at the first reflector group, the first reflector group and the second reflector group both comprise a plurality of reflectors arranged in rows and columns, and each of the reflectors in the second reflector group is rotatably mounted onto the lens body,
wherein each of the reflectors in the second reflector group comprises a reflector body and a driving member, the reflector body is rotatably mounted onto the lens body, and the driving member is connected to the reflector body to drive the reflector body to rotate and switch between a reflective state and a transmissive state, wherein
in a case that the reflector body is in the reflective state, a projection of the reflector body in a thickness direction of the lens body is a first projection, and the reflector body is configured to receive and reflect the light rays that are directed toward the first reflector group and reflected at the first reflector group; and
in a case that the reflector body is in the transmissive state, the projection of the reflector body in the thickness direction of the lens body is a second projection, and an area of the second projection is less than that of the first projection.

10. The optical glasses according to claim 9, wherein the driving member comprises a wire, the wire is fixed to the reflector body, the lens body is provided with two magnets disposed opposite each other, and the wire, in a case of being energized, moves within a magnetic field generated by the two magnets to drive the reflector body to rotate and switch between the reflective state and the transmissive state.

11. The optical glasses according to claim 10, wherein each of the reflectors in the second reflector group further comprises a reflector frame, the reflector frame is fixed to the lens body, the reflector body is rotatably mounted onto the reflector frame via a rotating shaft, and a direction of the magnetic field between the two magnets is perpendicular to an axial direction of the rotating shaft.

12. The optical glasses according to claim 11, wherein each of the reflector frames is provided with two magnets disposed opposite each other, and a direction of a magnetic field between the two magnets mounted onto the same reflector frame is perpendicular to the axial direction of the rotating shaft mounted onto the reflector frame.

13. The optical glasses according to claim 9, wherein the driving member comprises an electroactive member; in a case that the electroactive member is in one of an energized state and a de-energized state, the reflector body is maintained in the reflective state; and in a case that the electroactive member is in the other one of the energized state and the de-energized state, the reflector body is maintained in the transmissive state.

14. The optical glasses according to claim 13, wherein in a case that the reflector body is maintained in the transmissive state, a thickness direction of the reflector body is perpendicular to that of the lens body.

15. The optical glasses according to claim 9, wherein each reflector body in the second reflector group further has a superposition state, and in a case that the reflector body is in the superposition state, the driving member drives the reflector body to rotate and switch back and forth between the reflective state and the transmissive state.

16. The optical glasses according to claim 9, wherein a line connecting a center of the first reflector group and a center of the second reflector group is consistent with a propagation direction of a light ray from the center of the first reflector group to the center of the second reflector group, and an area of a figure surrounded by edges of the first reflector group is less than that of a figure surrounded by edges of the second reflector group.

* * * * *